United States Patent
Criel et al.

(10) Patent No.: US 9,399,326 B2
(45) Date of Patent: Jul. 26, 2016

(54) METHOD FOR FASTENING AN ACCESSORY IN A PLASTIC FUEL TANK

(71) Applicant: PLASTIC OMNIUM ADVANCED INNOVATION AND RESEARCH, Brussels (BE)

(72) Inventors: Bjorn Criel, Sint-Martens-Lennik (BE); Jules-Joseph Van Schaftingen, Wavre (BE); Pascal De Henau, Maleves-Ste-Marie (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 11 days.

(21) Appl. No.: 14/043,983

(22) Filed: Oct. 2, 2013

(65) Prior Publication Data

US 2014/0034649 A1    Feb. 6, 2014

Related U.S. Application Data

(63) Continuation of application No. 11/658,085, filed as application No. PCT/EP2005/053519 on Jul. 20, 2005, now Pat. No. 8,591,798.

(30) Foreign Application Priority Data

Jul. 23, 2004   (FR) ...................................... 04 08196

(51) Int. Cl.
   *B29C 49/20*    (2006.01)
   *B29D 22/00*    (2006.01)
   (Continued)

(52) U.S. Cl.
   CPC .............. *B29D 22/003* (2013.01); *B29C 49/20* (2013.01); *B29C 65/606* (2013.01);
   (Continued)

(58) Field of Classification Search
   CPC ............ B29C 49/20; B29C 2049/2008; B29C 2049/2034; B29C 65/606; B29C 66/532; B29C 66/8322; B29C 51/12; B29C 51/267; B29D 22/003
   USPC ........ 220/562, 4.14, 4.13, 678; 264/512, 511, 264/516, 550, 571, 545; 425/528
   See application file for complete search history.

(56) References Cited

U.S. PATENT DOCUMENTS

| 3,308,225 A | 3/1967 | Wells |
| 3,785,217 A | 1/1974 | Peura |

(Continued)

FOREIGN PATENT DOCUMENTS

| EP | 0 103 832 | 3/1984 |
| EP | 0 368 809 | 5/1990 |

(Continued)

OTHER PUBLICATIONS

U.S. Appl. No. 14/070,767, filed Nov. 4, 2013, Criel, et al.

*Primary Examiner* — Alison L Hindenlang
*Assistant Examiner* — Lawrence D Hohenbrink, Jr.
(74) *Attorney, Agent, or Firm* — Oblon, McClelland, Maier & Neustadt, L.L.P

(57) ABSTRACT

Method for stake-fastening an accessory (4) into a plastic fuel tank, whereby:
   the accessory (4) is equipped with at least one orifice (5) which passes right through the accessory (4);
   at least some of the plastic of which the wall of the tank (1) is made is melted; and
   some of the molten plastic is forced through the orifice (5) of the accessory without becoming detached from the remainder of the molten plastic;
   the protruding molten plastic is given an appropriate shape (8) to obtain a self-formed plastic rivet, and is left to solidify;
the size and shape of the orifice (5) and/or of the solidified plastic (8) being such that the accessory (4) is mechanically fastened to the tank by at least some of the solidified plastic (8), the stake-fastening of the accessory (4) occurring at the time of manufacture of the tank (1) through the moulding of a split or at least two-part parison.

44 Claims, 4 Drawing Sheets

Figure 1:
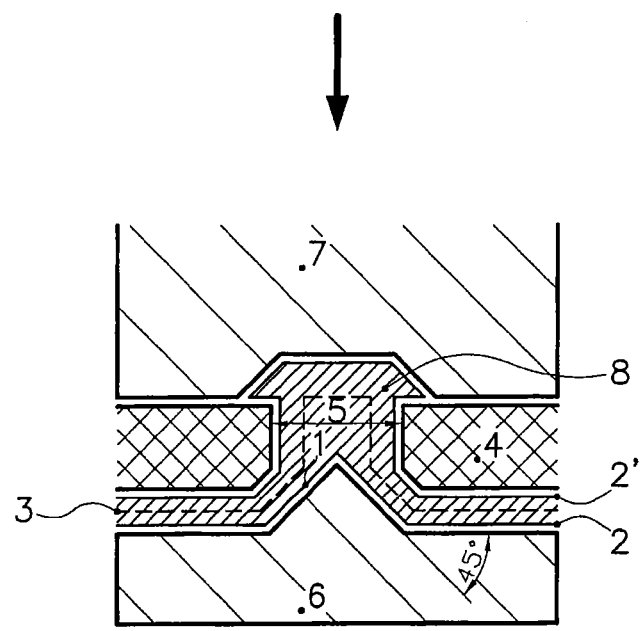

(51) Int. Cl.
 *B29C 65/60* (2006.01)
 *B29C 65/00* (2006.01)
 *B29C 51/12* (2006.01)
 *B29C 49/04* (2006.01)
 *B29C 51/26* (2006.01)
 *B29L 31/00* (2006.01)
 *B60K 15/03* (2006.01)

(52) U.S. Cl.
 CPC .............. *B29C 66/532* (2013.01); *B29C 66/71* (2013.01); *B29C 66/81429* (2013.01); *B29C 66/81431* (2013.01); *B29C 66/8322* (2013.01); *B29C 49/04* (2013.01); *B29C 51/12* (2013.01); *B29C 51/267* (2013.01); *B29C 66/7234* (2013.01); *B29C 66/81417* (2013.01); *B29C 2049/008* (2013.01); *B29C 2049/2034* (2013.01); *B29C 2791/001* (2013.01); *B29L 2031/7172* (2013.01); *B29L 2031/737* (2013.01); *B60K 15/03177* (2013.01); *B60K 2015/03453* (2013.01)

(56) References Cited

U.S. PATENT DOCUMENTS

| | | | |
|---|---|---|---|
| 4,116,608 A | 9/1978 | Uhlig | |
| 4,133,860 A | 1/1979 | Sharp | |
| 4,429,208 A * | 1/1984 | Eberle | H01M 2/305 219/119 |
| 4,891,000 A | 1/1990 | Ishii | |
| 5,308,427 A * | 5/1994 | Duhaime | B29C 65/028 156/245 |
| 5,326,514 A | 7/1994 | Linden et al. | |
| 5,445,783 A * | 8/1995 | Irish | B29C 49/20 264/515 |
| 6,620,722 B2 * | 9/2003 | Kuo | H01L 24/11 228/111.5 |
| 7,166,253 B2 | 1/2007 | Van Schaftingen et al. | |
| 8,580,064 B2 | 11/2013 | Jannot et al. | |
| 2001/0015513 A1 * | 8/2001 | Schaftingen | B29C 49/0047 264/515 |
| 2002/0014572 A1 | 2/2002 | Albritton | |
| 2002/0020487 A1 * | 2/2002 | Vorenkamp | B29B 13/023 156/244.19 |
| 2002/0094414 A1 * | 7/2002 | Wagenblast | B32B 3/10 428/139 |

FOREIGN PATENT DOCUMENTS

| | | |
|---|---|---|
| EP | 0 372 507 | 6/1990 |
| EP | 1 110 697 | 6/2001 |
| EP | 1 145 820 | 10/2001 |
| EP | 1 225 032 | 7/2002 |
| EP | 1 329 302 | 7/2003 |
| JP | 56 051333 | 5/1981 |
| JP | 59 120416 | 7/1984 |
| JP | 04 091923 | 3/1992 |
| JP | 09 323360 | 12/1997 |
| JP | 1 261 473 | 12/2002 |
| WO | 01 60592 | 8/2001 |
| WO | WO 2004 007182 | 1/2004 |

* cited by examiner

METHOD FOR FASTENING AN ACCESSORY IN A PLASTIC FUEL TANK

This application is a continuation of U.S. application Ser. No. 11/658,085, filed Oct. 4, 2007, which is a 371 of PCT/EP2005/053519, filed Jul. 20, 2005.

The present invention relates to a method for fastening an accessory in a plastic fuel tank.

Fuel tanks on board vehicles of various kinds generally have to meet imperviousness and permeability standards in relation to the type of use for which they are designed and the environmental requirements that they have to satisfy. Both in Europe and throughout the world we are currently experiencing a considerable tightening of the requirements concerned with limiting the emissions of pollutants into the atmosphere and into the environment in general. The design of fuel tanks is therefore evolving quickly towards techniques capable of better guaranteeing the imperviousness and safety under varying conditions of use. Furthermore, attempts are also being made to minimize the losses originating from the pipes and various accessories associated with the tanks. One means sometimes used is to incorporate certain accessories and pipe work within the tanks, thus eliminating their interface with the external surroundings. As a preference, these elements are fixed to the internal wall of the tank and do not pass through it, so as to avoid damaging the barrier layer often present in these tanks and so as to eliminate the risk of leakage associated with recourse to sealing devices.

Thus, Patent Application WO 01/60592 in the name of the applicant company discloses a method of manufacturing a plastic fuel tank from two shells formed by moulding, that are assembled, the moulding of at least one shell being performed by compressing part of a sheet of plastic between a mould and a punch and by blowing the remaining part of the sheet in the region not compressed. The advantage of this method is that it allows one or more accessories easily to be included inside the tank, preferably by welding onto the internal face of the tank, for the permeability reasons mentioned hereinbelow. This fastening technique is simple but, unfortunately, limited to accessories having at least part of their basic surface made of the same plastic as the tank (generally HDPE) or, at least, of a plastic compatible therewith. Now, numerous accessories are based either on a metal or on a plastic different from that of the tank, having improved rigidity, improved dimensional stability and improved impermeability to hydrocarbons, such as polyacetal (and, in particular, polyoxymethylene or POM), polyamide, possibly glass-fibre-reinforced polyamide, polybutylene terephthalate (PBT) etc. An alternative fastening technique proposed in this patent application consists in at least partially coating the accessory with part of the sheet at the time of its moulding. However, such a practice uses up a great deal of material and sometimes requires significant modifications to be made to the accessory. Furthermore, this technique may generate deformations and internal tensions as the skin of the tank cools.

It is therefore an object of the invention to provide a method that allows an accessory based on a material different from that of the tank to be fastened inside a plastic fuel tank, and fastened quickly, easily, without consuming excessive amounts of material and without the risk of damaging the barrier layer or of creating excessive internal tensions.

The invention is based on the idea of benefiting from the fact that a parison is melted during its moulding, and that it can be opened up (i.e. split or made up of two independent parts that can be parted from one another) so that an accessory can be stake-fastened in it. This fastening technique is used in application U.S. Pat. No. 5,308,427, but in order to fasten an accessory in an existing (already manufactured) fuel tank that has to be locally heated (using hot gas or the injection of molten material). As the fastening occurs after production, it is not possible to benefit from a local flux of material. In consequence, that technique requires an external addition of material, with the inherent risks of non-homogeneity. Furthermore, in the case of a multilayer tank (typically, made of high density polyethylene (HDPE)) with a layer of EVOH (a copolymer of ethylene and partially hydrolysed vinyl acetate), it is necessary to be careful not to damage the continuity of the barrier layer. It is therefore necessary to melt through the entire thickness locally. This heating step is lengthy and consumes power and furthermore gives rise to deformation and local tensions.

The invention therefore relates to a method for stake-fastening an accessory in a plastic fuel tank, whereby:
- the accessory is equipped with at least one orifice which passes right through the accessory;
- at least some of the plastic of which the wall of the tank is made is melted; and
- some of the molten plastic is forced through the orifice of the accessory without becoming detached from the remainder of the molten plastic;
- the protruding molten plastic is given an appropriate shape to obtain a self-formed plastic rivet, and is left to solidify;

the size and shape of the orifice and/or of the solidified plastic being such that the accessory is mechanically fastened to the tank by at least some of the solidified plastic, the stake-fastening of the accessory occurring at the time of manufacture of the tank through the moulding of a split or at least two-part parison.

The term "fuel tank" is intended to denote a sealed tank able to store fuel under diverse and varying environmental and usage conditions. An example of this tank is a tank fitted to motor vehicles.

The fuel tank produced according to the method according to the invention is made of plastic, that is to say of a material comprising at least one synthetic resin polymer.

All types of plastic may be suitable. Particularly suitable plastics come from the thermoplastics category.

The term "thermoplastic" denotes any thermoplastic polymer, including thermoplastic elastomers, as well as blends thereof. The term "polymer" denotes both homopolymers and copolymers (especially binary or ternary copolymers). Examples of such copolymers are, non-limitingly, random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10° Celsius are particularly suitable. Examples of such materials include those that exhibit polydispersion in their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers such as, for example, but non-limitingly, carbon, salts and other inorganic derivatives, natural fibres or polymeric fibres. It is also possible to use multilayer structures consisting of stacked layers bonded together comprising at least one of the polymers or copolymers described above.

One polymer which is often used is polyethylene. Excellent results have been obtained with high density polyethylene (HDPE). As a preference, the tank also comprises a layer of a resin impermeable to the fuel, such as EVOH for example (a copolymer of ethylene and partially hydrolysed vinyl acetate). Alternatively, it may be subjected to a surface treatment (fluoration or sulphonation) the purpose of which is to render it impermeable to the fuel.

An "accessory" is intended to denote:
- any object or functional device generally associated with the fuel tank in its conventional mode of use or of operation and which collaborates therewith in order to perform certain useful functions; or
- a support for one or several of such devices.

Non-limiting examples of such devices are: liquid pumps, level gauges, pipettes, tanks or baffles internal to the fuel tank, ventilation devices, electronic units and stiffening bars.

According to one advantageous embodiment of the method according to the invention, the accessory is in actual fact a preassembled structure comprising a support and one or several identical or different devices which are fixed by any suitable fastening means. Examples of these means are clipping, screw-fastening, welding, etc. It is also advantageous for the preassembled structure to bear means that allow additional devices that may be added on later to be attached. These means are also clipping devices, tapped holes or threaded protrusions of circular shape to allow screwing, surface regions suited to welding, etc. In the same vein, the accessory may consist of a simple support comprising suitable means for the later attachment of one or more devices. In other words, as a preference, the accessory comprises a support which is either equipped with fastening means for one or several functional devices of the fuel tank (and which may be the lid of the accessory), or bears one or several such devices directly. In this case, the orifice used for stake-fastening the accessory is preferably situated on the support.

According to the invention, the accessory comprises an orifice (hole) which passes right through its wall and allows the "staking" technique to be applied. This technique consists in forcing molten plastic through the orifice and causing it to protrude on the opposite side to the entry of said material into the orifice, while at the same time giving the protruding plastic an appropriate shape such that it somewhat "self-forms" a plastic rivet (i.e. it forms the rivet in-situ from molten plastic from the wall of the tank). This shape is generally that of a plateau.

The orifice may have any shape. However, its cross section (in section parallel to the wall of the accessory) will generally not be constant but will vary in such a way as to create a volume (intended to be occupied by the molten plastic) of a suitable shape so as to create a non-removable mechanical connection once the said material has solidified. Furthermore, the shape of the cross section (and its variation along a plane perpendicular to the wall of the accessory) will preferably be tailored in such a way as to make it easier to force the material through the orifice, and for this to be done using an appropriate tool (insert).

It is also often advantageous from a technical standpoint to contrive for the molten plastic not to entirely fill the orifice, and for this to be achieved by means of an appropriate tool (counterform). This approach allows variations in volume of the plastic (shrinkage upon cooling, swelling upon contact with the fuel) to be accommodated without generating stresses. In this case, the plateau will preferably have a more or less oblong shape (whereas it is generally more or less circular in shape, as, incidentally, is the upper part of the orifice) or semi-oblong shape (if the flow of material through the orifice has been impeded on just one side, something which may be advantageous because the shrinkage is typically greater than the swelling in the presence of petrol), the orifice then preferably also having a more or less oblong shape. The tools mentioned hereinabove (insert, counterform in the mould) are preferably cooled so as to accelerate the actual fastening of the accessory and allow the rates of manufacture of integrated tanks (comprising at least one fixed accessory) to be increased.

In general, in the method according to the invention, recourse is had to several staking orifices. These are in fact somewhat pinpoint-like, i.e. small in size by comparison with the size of the accessory. Typically, their size is of the order of a few mm (10 mm or less).

An advantageous embodiment positions the staking orifices, for the oblong or semi-oblong versions, in the direction of the dimensional changes. These changes generally occur along lines which meet at a point located at the centre of the various orifices. In the case of (more or less) oblong orifices, one way of achieving this is to arrange the said orifices in such a way that the planes normal to the surface of the accessory at the orifices and containing the longitudinal axes thereof intersect along the same axis (i.e. along one and the same straight line which kind of constitutes an axis of symmetry of the accessory). When the longitudinal axes of the various orifices are in one and the same plane, this amounts to saying that these axes meet at a point more or less at their centre. This approach allows the accessory not to be deformed or shifted excessively with respect to the centre of the various orifices.

In the method according to the invention, the plastic of which the wall of the tank is made at the site intended for fastening the accessory is melted (which means to say in fact that it is truly subjected to fusion in the case of a semicrystalline polymer such as HDPE, but in fact means to say plasticized/softened in the case of amorphous polymers). The pasty material is then forced through the orifice of the accessory without detaching from the wall of the tank, and to solidify there. As already mentioned earlier, the size and shape of the orifice and/or of the solidified plastic are such that the accessory is mechanically fastened to the tank by at least some of the solidified plastic.

The accessory is fastened by the method according to the invention at the time of manufacture of the tank by moulding. This approach can be achieved in practice by virtue of the fact that moulding takes place starting from a split or at least two-part parison. In particular, advantageously, the stake-fastening occurs at the time of moulding of the tank by:
- thermoforming sheets;
- compressing/blow-moulding sheets (as described in the aforementioned application WO 01/60592, the content of which for this purpose is also incorporated into this application);
- blow-moulding a parison comprising at least one cut-out (as described in Patent Application EP 1110697, the content of which for this purpose is incorporated by reference into this application).

When the tank is produced by thermoforming sheets (a technique that essentially employs a mould consisting of two moulding cavities), the stake-fastening may be performed by a robot which introduces the accessory between the two parts of the mould in which the sheets are inserted and pushes it against these sheets in order to perform the stake-fastening. In this case, the tooling mentioned hereinabove (insert, counterform in the mould) can be incorporated into the robot arm.

When the tank is produced by blow-moulding or by compression/blow-moulding (techniques both of which simultaneously use a core and an actual mould proper consisting of moulding cavities), the stake-fastening is preferably performed with the aid of an insert on the mould side (so as to force the material through the orifice) and a counterform actuated by a ram on the core side (so as to deform the material which has protruded through the orifice).

A method of manufacturing the tank and of fastening the accessory by blow-moulding (in a mould comprising a core and a moulding cavity) which uses such accessories generally runs as follows:

positioning the accessory on the core;

initial closing of the mould (moulding cavities brought around the core);

pressing a split or at least two-part parison (or wall of a fuel tank made of plastic in the molten state) onto the moulding cavities of the mould (by blowing through the core and applying suction behind the moulding cavities);

advancing a hydraulic ram which is fastened to the core in order to perform the staking;

pricking the parison using a needle;

degassing, opening the mould, removing the core, closing the mould again and blowing in a conventional manner.

During this method, there is of course a retraction of the hydraulic ram which may occur before, during and/or after degassing. There is also a device preventing the slot or the edges of the parts of the parison from welding together during the initial closing of the mould (in order to perform the stake-fastening). To achieve this, the moulding cavities of the mould are advantageously provided with a heat regulating device that allows this region to be heated during the steps involved with the initial closing of the mould. Such a device is described for example in application FR 04.13407 in the name of the applicant company, the content of which for this purpose is incorporated by reference into this application.

In this method, the insert preferably bears a protrusion in the shape of a spike making an angle preferably of between 30 and 60°, or even 40 and 50°, and ideally of about 45°, thus encouraging the material of which the wall is made to flow through the orifice. Any abrupt transition in angle may be provided with a rounded radius so as to optimize the flow during the staking phase while at the same time preventing the barrier layer of the tank, if there is one, from rupturing.

With a view to strengthening the mechanical connection between the accessory and the wall of the tank, the counterform preferably applies pressure via the hydraulic ram not only to the accessory itself but also at least partially to the molten plastic of the wall of the tank surrounding the accessory to encourage its compaction.

The present invention also relates to a plastic fuel tank equipped with at least one (support for) accessory in direct contact with part of the wall of the tank and being equipped with several orifices of more or less oblong shape in which and over which plastic identical to that of the wall of the tank is present, these orifices being arranged in such a way that the planes normal to the surface of the accessory at the orifices and comprising the longitudinal axes of the latter intersect on one and the same axis.

In the context of the invention, the accessory may be based on a material different from the wall of the tank. Advantageously, the accessory is based on at least one material compatible or compatibilized with that of the wall of the tank (for example PA compatibilized with HDPE in particular by a suitable surface treatment or alternatively by overmoulding with an adhesive), which allows a strengthened mechanical fastening and imperviousness through chemical bonding between the two materials when the accessory comes into contact with the molten material of the tank to be fastened to the latter. Alternatively, the accessory may be made of two materials, one offering dimensional stability and the other permitting adhesion between the accessory and the wall of the tank. For example, an accessory made of a material other than HDPE (for example made of POM) can be overmoulded with HDPE.

The purpose of FIGS. 1 to 4 is to illustrate certain concrete aspects of the invention without in any way wishing to limit its scope.

Figure 2:
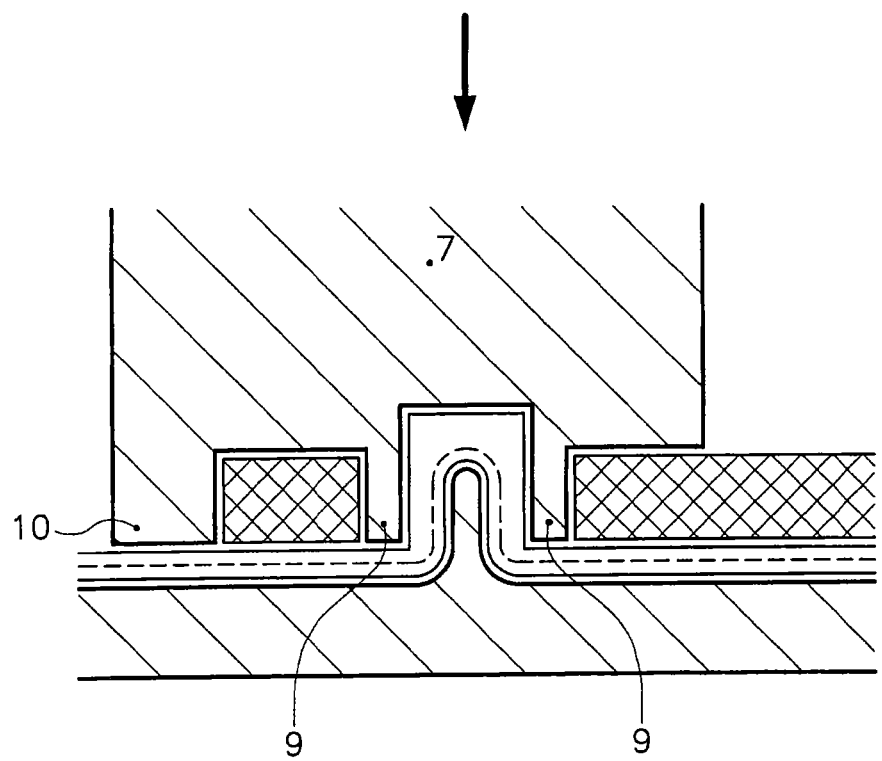
Figure 3:
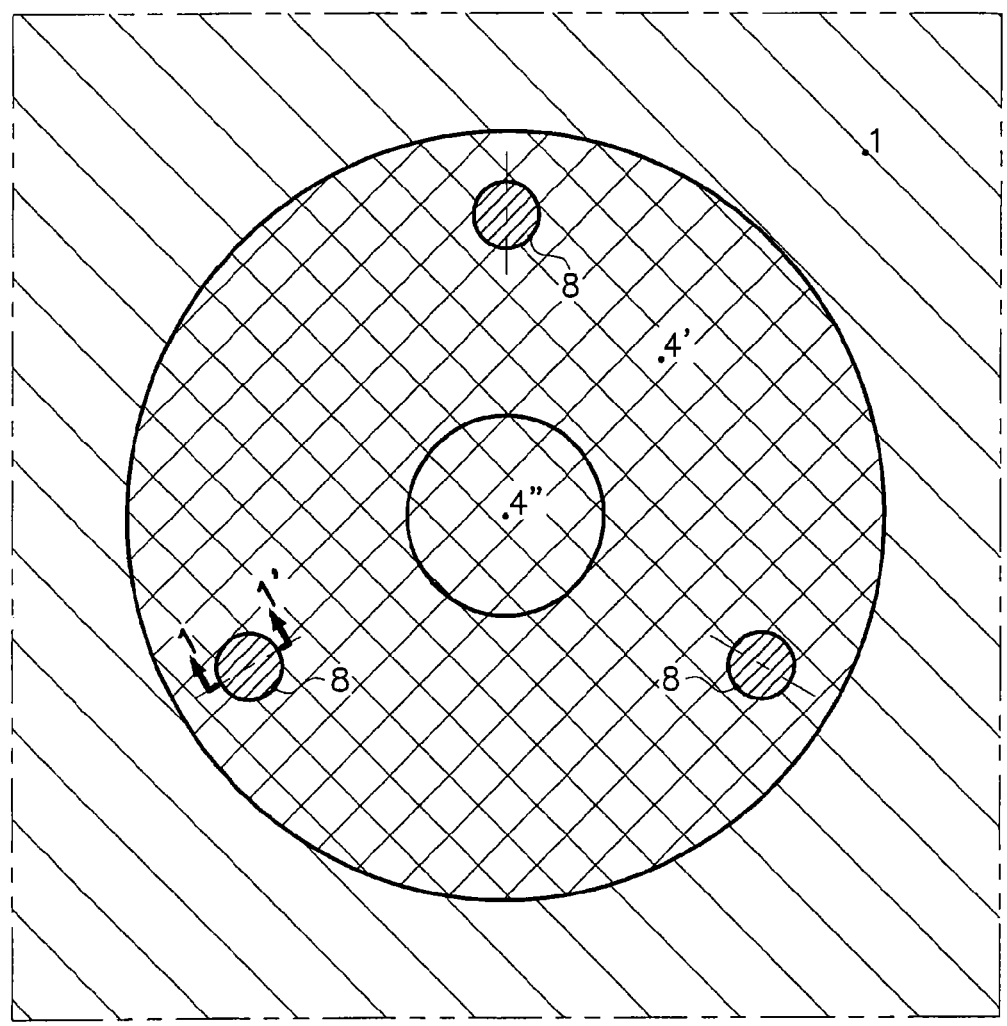
Figure 4:
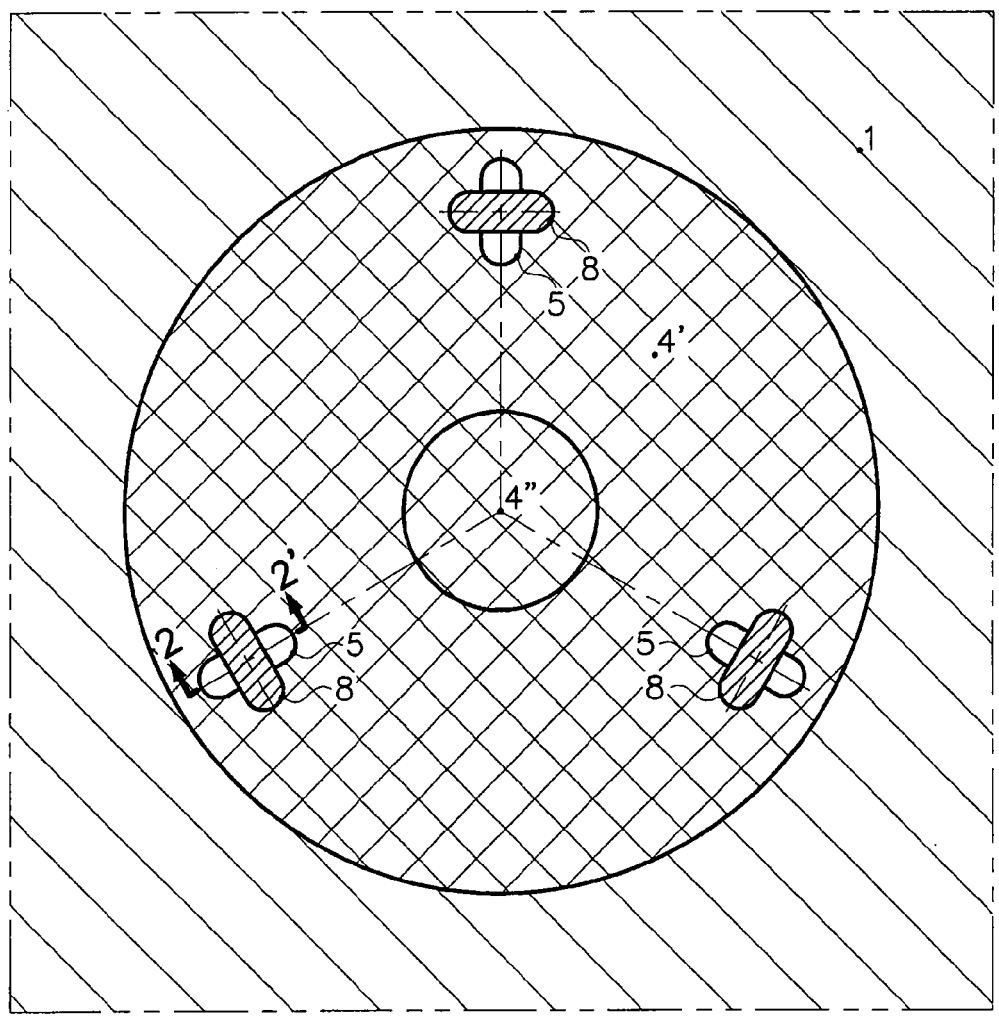

FIGS. 1 and 2 each depict a section (on a plane perpendicular to the surface of the tank at this point) through a tank to which an accessory is in the process of being stake-fastened, the said tank being in the process of being manufactured by moulding but the section confining itself to the vicinity of a staking point of given geometry. FIGS. 3 and 4 depict a view of the internal surface of the finished tank (bearing the accessory) seen in section (on planes 1-1' and 2-2' respectively) of FIGS. 1 and 2.

FIGS. 1 and 2 depict a fraction of the wall of a fuel tank (1) comprising two layers of HDPE (2,2') one on each side of a layer of EVOH (3), the said tank being in the process of being manufactured by moulding a two-part parison. An accessory (4) equipped with at least one orifice (5) is in the process of being stake-fastened to this wall (1). Constituent material of the wall of the tank (1) has been forced through this orifice (5) by means of an insert (6) fixed in the mould and has been deformed on the inside of the tank by a counterform (7) operated by a ram (not depicted but acting in the direction of the arrow) so as to form a kind of plateau (8) which overhangs the orifice (5) and prevents the accessory (4) from being removed without tearing/destroying the plateau (8). To these ends, the plateau (8) has dimensions tailored to the desired mechanical strength for the fastening of the accessory before and after contact with a fuel.

The insert (6) and the counterform (7) are cooled in order to accelerate the setting of the molten plastic around the orifice (5). The insert (6) bears a protrusion in the shape of a spike making an angle of about 45° (see FIG. 1), encouraging the constituent material of the wall (1) to flow through the orifice (5). In FIG. 2, the abrupt transitions in angle have been given a rounded radius to optimize the flow during the stake-fastening phase while at the same time avoiding rupturing the layer of EVOH.

In the case illustrated in FIG. 1, the plateau (8) is circular and plastic occupies the entire orifice (5).

In the case illustrated in FIG. 2, the circular plateau (8) has been deformed (rendered oblong) by an appropriate relief (9) on the counterform (7), this being so as to absorb the dimensional changes introduced by shrinkage during cooling of the tank and expansion by swelling upon contact with the fuel. In order to ensure good filling of this plateau (8), the counterform (7) has been designed to overhang the accessory (4) (see part (10) in the figure) and press against the wall of the tank (1) in the vicinity of the accessory (4). This approach makes it possible to increase the internal pressure at the plateau (8) and therefore improve the compacting in the plateau (8).

The respective shapes of the plateaus (8) in the two cases are illustrated in FIGS. 3 and 4 respectively, in an overall view of the interior surface of the tank bearing the accessory. In FIG. 3, the orifice (5), which is not visible, is circular and in FIG. 4, the orifice is oblong.

The accessory (4) illustrated in these figures comprises a support (4') which allows for ease of staking (illustrated in the form of 3-point staking in these figures) and the accessory proper (4") secured to it. It can be seen in FIG. 4 that the axes (see dotted lines) of the oblong orifices (5) meet at the centre of the support of the accessory (4') which is more or less flat.

The invention claimed is:

1. A method for stake-fastening an accessory into a multilayer plastic fuel tank comprising a thermoplastic outer layer and either a fuel-impermeable inner layer or fuel-impermeable inner surface treatment,
   wherein the accessory has a wall portion which
      is equipped with at least one orifice which passes through the wall portion of the accessory, and
      said at least one orifice has a variation along a plane perpendicular to the wall of the accessory that is tailored to make it easier to force molten plastic through the orifice,
said method comprising:
   melting at least some of the plastic of which the wall of the tank is made to form molten plastic;
   forcing some of the molten plastic through the orifice of the accessory without becoming detached from the remainder of the molten plastic and without rupturing the fuel-impermeable inner layer or fuel-impermeable inner surface treatment of the multilayer plastic fuel tank wall, thereby forming molten plastic protruding through the orifice of the accessory;
   shaping the protruding molten plastic to provide a self-formed plastic rivet, and allowing the molten plastic to solidify; and
   closing the multilayer plastic fuel tank with the stake-fastened accessory therein; whereby the size and shape of the orifice and/or of the solidified multilayer plastic are such that the accessory is mechanically fastened to the inside wall of the multilayer plastic fuel tank by at least some of the solidified plastic.

2. The method according to claim 1, wherein the multilayer plastic fuel tank wall comprises a thermoplastic outer layer of high density polyethylene (HDPE) and a fuel-impermeable inner layer of a copolymer of ethylene and partially hydrolysed vinyl acetate (EVOH).

3. The method according to claim 1, wherein the multilayer plastic fuel tank wall comprises a thermoplastic polymer outer layer of high density polyethylene (HDPE) and an inner surface treatment applied to the high density polyethylene so as to render it impermeable to the fuel.

4. The method of claim 1, wherein the surface of a wall portion forming the orifice of said accessory intersects the surface of the wall portion contacting the molten plastic to form an acute angle corner with respect to the thickness direction of the wall portion.

5. The method of claim 1, wherein said accessory has a wall portion which has, in the vicinity of the at least one orifice, an acute-angled corner with respect to the thickness direction of the wall portion.

6. The method of claim 5, wherein the acute-angled corner is an angle of between 30° and 60°.

7. The method of claim 5, wherein the acute-angled corner is an angle of between 40° and 50°.

8. The method of claim 5, wherein the acute-angled corner is an angle of about 45°.

9. The method according to claim 1, wherein the accessory is one of the following elements: a liquid pump, a level gauge, a pipette, a tank internal to the fuel tank, a baffle internal to the fuel tank, a ventilation device, an electronic unit and a stiffening bar.

10. The method according to claim 1, wherein the accessory is a liquid pump.

11. The method according to claim 1, wherein the accessory is a level gauge.

12. The method according to claim 1, wherein the accessory is a baffle internal to the fuel tank.

13. The method according to claim 1, wherein the accessory is a ventilation device.

14. A plastic fuel tank equipped with at least one accessory or support for an accessory, wherein the plastic fuel tank is a multilayer plastic fuel tank comprising a thermoplastic outer layer and either a fuel-impermeable inner layer or fuel-impermeable inner surface treatment and the accessory or support for an accessory is in direct contact with part of the wall of the fuel tank and comprises a wall portion which includes at least one orifice of oblong shape in which a multilayer plastic identical to that of the wall of the tank is present and stake-fastens the at least one accessory or support for an accessory to the plastic fuel tank, the wall portion of the accessory or the support for an accessory having, in the vicinity of the at least one orifice, a surface for supporting a rivet head and said at least one orifice has a variation along a plane perpendicular to the wall of the accessory that is tailored to make it easier to force molten plastic through the orifice, and wherein the accessory is held in a non-removable mechanical connection to the inside wall of the multilayer plastic fuel tank.

15. The plastic fuel tank of claim 14, wherein the surface of a wall portion forming the orifice of said accessory intersects the surface of the wall portion contacting the molten plastic to form an acute angle corner with respect to the thickness direction of the wall portion.

16. The plastic fuel tank of claim 14, wherein said accessory has a wall portion which has, in the vicinity of the at least one orifice, an acute-angled corner with respect to the thickness direction of the wall portion.

17. The plastic fuel tank of claim 16, wherein the acute-angled corner is an angle of between 30° and 60°.

18. The plastic fuel tank of claim 16, wherein the acute-angled corner is an angle of between 40° and 50°.

19. The plastic fuel tank of claim 16, wherein the acute-angled corner is an angle of about 45°.

20. The plastic fuel tank of claim 14, wherein the accessory is one of the following elements: a liquid pump, a level gauge, a pipette, a tank internal to the fuel tank, a baffle internal to the fuel tank, a ventilation device, an electronic unit and a stiffening bar.

21. The plastic fuel tank of claim 14, wherein the accessory is a liquid pump.

22. The plastic fuel tank of claim 14, wherein the accessory is a level gauge.

23. The plastic fuel tank of claim 14, wherein the accessory is a baffle internal to the fuel tank.

24. The plastic fuel tank of claim 14, wherein the accessory is a ventilation device.

25. A multilayer plastic fuel tank equipped with at least one accessory or support for an accessory stake-fastened to the inner wall of the fuel tank, wherein:
   the wall of the fuel tank comprises an outer layer of thermoplastic polymer and a barrier layer of thermoplastic resin impermeable to fuel;
   at least one accessory or support for an accessory is in direct contact with part of the inner wall of the fuel tank;
   said at least one accessory or support for an accessory having a wall portion which
      is equipped with at least one orifice which passes through the wall portion of the accessory or support for an accessory, and
      said at least one orifice has a variation along a plane perpendicular to the wall of the accessory that is tailored to make it easier to force molten plastic through the orifice;

said at least one orifice having had some of the thermoplastic polymer of the outer layer and some of the barrier layer of the fuel tank wall forced in the molten state into and through the at least one orifice to form at least one thermoplastic protrusion from the opposite end of said at least one orifice and solidified without becoming detached from the fuel tank wall and without rupturing the barrier layer of thermoplastic resin impermeable to fuel; and the protrusion having been shaped to overhang the at least one orifice and stake-fasten the at least one accessory or support for an accessory to the fuel tank wall without rupturing the barrier layer of the protrusion and said protrusion holds the accessory in a non-removable mechanical connection to the inside wall of the multilayer plastic fuel tank.

26. The multilayer plastic fuel tank according to claim 25, wherein the outer layer of thermoplastic polymer is high density polyethylene and the barrier layer of fuel impermeable resin is a copolymer of ethylene and partially hydrolysed vinyl acetate or high density polyethylene which has been surface treated so as to render it impermeable to the fuel.

27. The multilayer plastic fuel tank according to claim 25, wherein the opening of the at least one orifice in direct contact with part of the inner wall of the fuel tank is angularly shaped to encourage the thermoplastic material of which the wall is made to flow through said orifice without rupturing the barrier layer of the fuel tank wall.

28. The multilayer fuel tank according to claim 25, wherein the wall of the fuel tank comprises an outermost layer of thermoplastic polymer, a barrier layer of thermoplastic resin impermeable to fuel, and an innermost layer of thermoplastic polymer.

29. The multilayer plastic fuel tank according to claim 25, wherein the protrusion shaped to overhang the at least one orifice and stake-fasten the at least one accessory or support for an accessory to the fuel tank wall without rupturing the barrier layer of the wall of the fuel tank or the protrusion is shaped as a rivet.

30. The multilayer plastic fuel tank of claim 25, wherein the at least one accessory or support for an accessory is equipped with several oblong-shaped orifices in which and over which the thermoplastic layers comprising the wall of the fuel tank are present, these orifices being arranged in such a way that the planes normal to the surface of the accessory or support for an accessory at the orifices and the longitudinal axes of the orifice intersect on one and the same axis.

31. The multilayer plastic fuel tank according to claim 25, wherein the accessory or support for an accessory is a material different from that of the fuel tank.

32. The multilayer plastic fuel tank according to claim 25, wherein the accessory or support for an accessory is a material compatible with that of the fuel tank.

33. The multilayer plastic fuel tank according to claim 25, comprising a support for an accessory equipped with at least one orifice which passes through the support for an accessory.

34. The multilayer plastic fuel tank according to claim 25, comprising an accessory equipped with at least one orifice which passes through the accessory.

35. The multilayer plastic fuel tank of claim 25, wherein the surface of a wall portion forming the orifice of said accessory intersects the surface of the wall portion contacting the molten plastic to form an acute angle corner with respect to the thickness direction of the wall portion.

36. The multilayer plastic fuel tank of claim 25, wherein said accessory has a wall portion which has, in the vicinity of the at least one orifice, an acute-angled corner with respect to the thickness direction of the wall portion.

37. The multilayer plastic fuel tank of claim 36, wherein the acute-angled corner is an angle of between 30° and 60°.

38. The multilayer plastic fuel tank of claim 36, wherein the acute-angled corner is an angle of between 40° and 50°.

39. The multilayer plastic fuel tank of claim 36, wherein the acute-angled corner is an angle of about 45°.

40. The multilayer plastic fuel tank of claim 25, wherein the accessory is one of the following elements: a liquid pump, a level gauge, a pipette, a tank internal to the fuel tank, a baffle internal to the fuel tank, a ventilation device, an electronic unit and a stiffening bar.

41. The multilayer plastic fuel tank of claim 25, wherein the accessory is a liquid pump.

42. The multilayer plastic fuel tank of claim 25, wherein the accessory is a level gauge.

43. The multilayer plastic fuel tank of claim 25, wherein the accessory is a baffle internal to the fuel tank.

44. The multilayer plastic fuel tank of claim 25, wherein the accessory is a ventilation device.

* * * * *